United States Patent [19]

Mottate

[11] Patent Number: 4,753,540

[45] Date of Patent: Jun. 28, 1988

[54] MOUNTING STRUCTURE OF A LINEAR MOTION ROLLING CONTACT BEARING ASSEMBLY

[75] Inventor: Tatsuo Mottate, Mitaka, Japan

[73] Assignee: Nippon Thompson Co., Ltd., Japan

[21] Appl. No.: 939,221

[22] Filed: Dec. 8, 1986

Related U.S. Application Data

[63] Continuation of Ser. No. 788,357, Oct. 17, 1985, abandoned.

[30] Foreign Application Priority Data

Oct. 18, 1984 [JP]  Japan .................. 59-156356[U]

[51] Int. Cl.$^4$ ................ F16C 29/00; F16C 29/04; F16C 43/04
[52] U.S. Cl. ................................ 384/7; 384/10; 384/22; 384/59
[58] Field of Search ............... 384/7, 10, 17, 18–23, 384/37, 41, 54, 55, 59

[56] References Cited

U.S. PATENT DOCUMENTS

| | | | |
|---|---|---|---|
| 3,099,232 | 7/1963 | Cooper | 308/3.8 X |
| 4,537,450 | 8/1985 | Baxter | 308/3.8 |
| 4,552,415 | 11/1985 | Fulterer | 308/3.8 |

*Primary Examiner*—Stuart S. Levy
*Assistant Examiner*—Thomas R. Hannon
*Attorney, Agent, or Firm*—Thomas S. MacDonald; Alan H. MacPherson; Paul J. Winters

[57] ABSTRACT

A mounting structure for mounting a linear motion rolling contact bearing assembly using a bolt extending through a mounting hole provided in a guide rail and/or a slider member of the bearing assembly includes a mounting area which is defined by a slit, an outwardly projecting stepped section or a combination thereof so as to confine any deformation or error in size therein and prevent it from being transmitted to other sections when the bolt is tightened for fixedly mounting the bearing assembly to a supporting member.

8 Claims, 6 Drawing Sheets

MOUNTING STRUCTURE OF A LINEAR MOTION ROLLING CONTACT BEARING ASSEMBLY

This application is a continuation of application Ser. No. 788,357 filed Oct. 17, 1985, now abandoned.

BACKGROUND OF THE INVENTION

1. Field of the Invention

This invention relates to a bearing assembly mounting structure, and, in particular, to a structure for mounting a linear motion rolling contact bearing assembly to a supporting structure, such as a machine frame.

2. Description of the Prior Art

A bearing assembly is fixedly mounted on a supporting structure when used. For example, in the case of a linear motion rolling contact bearing assembly including a guide rail extending straight over a length, a slider member which moves along the guide rail and a plurality of rolling members interposed between the guide rail and the slider member to provide a smooth relative motion between the guide rail and the slider member, both of the guide rail and the slider member must be fixedly attached to respective supporting members, such as a machine frame and an object to be moved.

As shown in FIG. 5, a guide rail 1 is typically formed by bending a steel plate so as to have a U-shaped cross section so that it has a bottom wall and a pair of side walls extending upward from opposite sides of the bottom wall. Each of the side walls of the guide rail 1 is provided with a guide groove at its outer surface so as to receive a plurality of balls 5 as rolling members. The outermost distance defined by the outermost points of the balls 5 on both sides of the guide rail 1 as shown in FIG. 5 is designated by $P_2$, and this distance $P_2$ must be maintained within a predetermined accuracy. However, since the guide rail 1 is typically formed from a steel plate by bending, even if the distance $P_2$ is set within a predetermined tolerance after manufacture, it is likely that the bottom wall of the guide rail 1 is not straight, but it is warped outwardly as shown in FIG. 5. In such a case, when the guide rail 1 is fixedly mounted on a supporting member 2, such as a machine frame, by means of a bolt 3, it is highly likely that the distance $P_2$ would change beyond a predetermined tolerance as bolt 3 is tightened. Another such example is shown in FIG. 8, in which, the U-shaped guide rail 1 is warped inwardly prior to tightening of the bolt 3.

On the other hand, even if the guide rail 1 has an almost perfect U-shape after manufacture as shown in FIG. 7, when the bolt 3 is tightened, there is produced an elastic deformation by the amount, thereby defining a deflection angle $\theta$ shown in FIG. 6. With such a deflection angle $\theta$, there is also produced an error in the distance P corresponding to the change in expanse between the outermost points of the balls 5 on both sides of the guide rail 5. The presence of such an error in the distance P is not desirable because this could severely affect the performance of the bearing assembly as a whole. For example, there could be produced an increase in rolling contact resistance or a significant play for the balls interposed between the guide rail 1 and the slider member.

SUMMARY OF THE INVENTION

In accordance with the principle of the present invention, there is provided a mounting structure of a bearing assembly, which includes a mounting area defined around a mounting hole provided in the bearing assembly for mounting the bearing assembly to a supporting member. In one form of the invention, the mounting area includes at least one slit of desired shape provided around the mounting hole so as to isolate the mounting area from the rest of the bearing assembly thereby preventing any error in size from being produced in the bearing assembly when a mounting bolt extending through the mounting hole is tightened. In another embodiment of the present invention, the mounting area includes a stepped section which projects outwardly in the form of a mesa so that the mounting area is isolated from the rest of the body as far as deformation is concerned. In other words, even if the mounting area is deformed due to tightening of the mounting bolt which extends through the mounting hole provided in the mounting area, this deformation is constrained within the mounting area and is not transmitted to the other sections of the body.

It is therefore a primary object of the present invention to obviate the disadvantages of the prior art and to provide an improved mounting structure for mounting a bearing assembly.

Another object of the present invention is to provide an improved structure for mounting a linear motion rolling contact bearing assembly to a supporting structure, such as a machine frame.

A further object of the present invention is to provide an improved structure for mounting a linear motion rolling contact bearing assembly to a desired object without producing changes in dimensional accuracy and performance.

Other objects, advantages and novel features of the present invention will become apparent from the following detailed description of the invention when considered in conjunction with the accompanying drawings.

DESCRIPTION OF THE PREFERRED EMBODIMENTS

Although the application of the bearing assembly mounting structure in accordance with the present invention should not be limited only to a linear motion rolling contact bearing assembly, it is most effective when applied to this type of bearing assembly. And, thus, for the purpose of illustration only, the following description will be made for the case where the present invention is applied to a linear motion rolling contact bearing assembly.

Figure 9A:
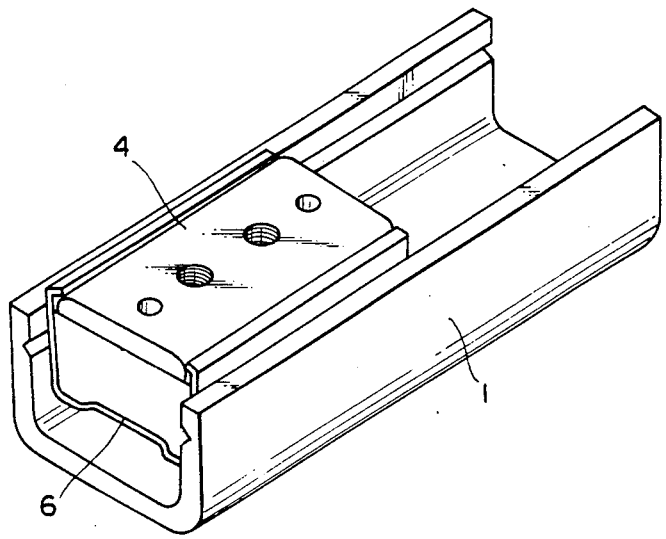
FIGS. 9a and 9b are schematic, perspective and transverse, partly cross sectional views, respectively, which show an infinite-range type linear motion rolling contact bearing assembly to which the present invention may be advantageously applied.
Figure 9B:
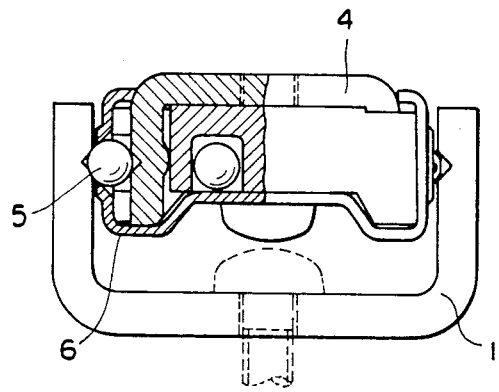

A linear motion rolling contact bearing assembly is well known in the art, and a linear motion rolling contact bearing assembly of the infinite-range type is illustrated in FIGS. 9a and 9b. As shown, this type of linear motion rolling contact bearing assembly generally includes an elongated guide rail extending over a length, a slider member 4 which moves along the rail 1, a plurality of balls 5 provided in an endless path including a load section in which the balls 5 are interposed between the guide rail 1 and the slider member 4, and a retainer 6 for retaining the balls 5 in position. Since the balls 5 are provided in the endless path defined in the slider member 4, whereby the balls 5 can move indefinitely by circulating around this endless path, the slider member 4, in principle, can move along the guide rail 1 however long it may be.

The guide rail 1 is elongated and it is typically formed by bending a steel plate so as to have a U-shaped cross section. Thus, the guide rail 1 has a flat bottom wall and a pair of side walls extending upwardly from opposite sides of the bottom wall. The inner surface of each of the side walls of the guide rail 1 is provided with a guide groove extending in parallel with the longitudinal axis of the guide rail 1. The slider member 4, which is also often called a "table", is typically formed by bending a steel plate so as to have an inverted U-shape so that it has a flat top wall and a pair of side walls extending downward from opposite sides of the top wall. Each of the side walls of the slider member 4 is provided with a guide groove at its outer surface, which is located opposite to the guide groove of the guide rail 1 thereby defining a load path section which constitutes part of the endless circulating path for the balls 5. The generally U-shaped retainer 6 is clamped to the slider member 4 so as to maintain the balls 5 to circulate along the predetermined endless path while the slider member 4 moves along the guide rail 1.

Such a linear motion rolling contact bearing assembly is mounted to provide a linear relative motion between a first object and a second object, for example, of a robot in an automated assembly line. For this purpose, the guide rail 1 is provided with at least one mounting hole and similarly the slider member 4 is also provided with at least one mounting hole. Such a mounting hole may be either threaded or unthreaded, but a bolt is typically used to mount either of the guide rail 1 or slider member 4 to a desired object. As will be made clear later, a mounting area is defined around each of such mounting holes with the application of the present invention so as to avoid production of any errors in size after mounting.

Figure 10A:
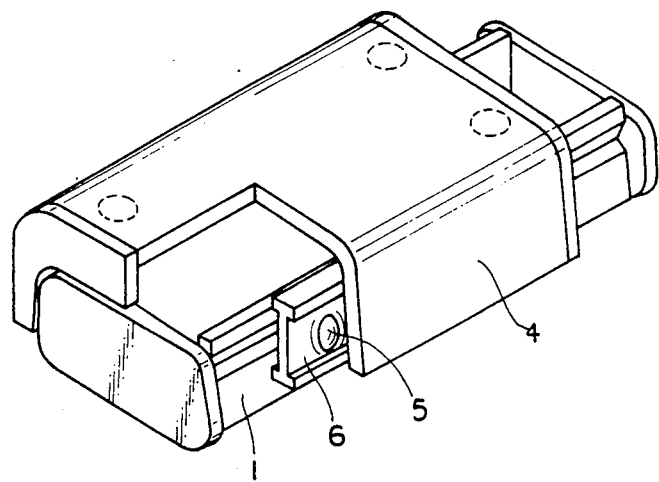
FIGS. 10a and 10b are schematic, perspective and transverse, partly cross sectional views, respectively, which show a finite-range type linear motion rolling contact bearing assembly to which the present invention may also be advantageously applied.
Figure 10B:
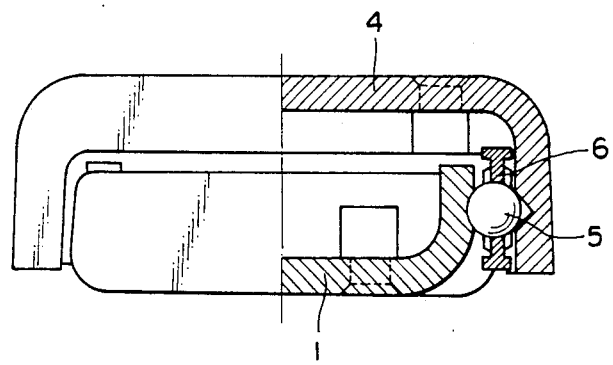

FIGS. 10a and 10b show another type of linear motion rolling contact bearing assembly in which the range of linear motion between the guide rail 1 and the slider member 4 is limited due to structural constraints. In the illustrated embodiment, the guide rail 1 is typically formed by bending a steel plate to have a U-shaped cross section and the slider member 4 is also typically formed by bending a steel plate to have a U-shaped cross section. The slider member 4 is slightly larger than the guide rail 1 in transverse direction so that the slider member of the guide rail 1 when assembled. A pair of straight guide grooves are provided at opposed side walls of the guide rail 1 and the slider member 4 and a plurality balls 5 are interposed between the pair of guide grooves while being retained by the retainer 6. In this type of linear motion rolling contact bearing assembly, the retainer 6 is comprised of a straight plate provided with a plurality of receiving holes for maintaining therein the balls 5 in position and there is no endless path for the balls 5 so that the relative linear motion between the guide rail 1 and the slider member 4 is limited.

Also in this type of linear motion rolling contact bearing assembly, the guide rail 1 and the slider member 4 are both generally provided with at least one mounting hole, thereby allowing them to be fixedly mounted on a desired supporting member, such as a machine frame or to a desired object. It is preferable that a mounting area is defined around each of such mounting holes so as to isolate the mounting area from the rest of the body as far as production of deformation is concerned. In this infinite-range type assembly as with the previously described infinite-range type linear motion rolling contact bearing assembly, it is often desired that either one or both of the guide rail 1 and the slider member 4 be formed from a thin steel plate so as to make the entire assembly light in weight. In such a case, it is most likely that errors in size are produced when the assembly is fixedly mounted. However, with the application of the mounting structure in accordance with the present invention, such a disadvantage may be effectively eliminated.

Figure 1A:
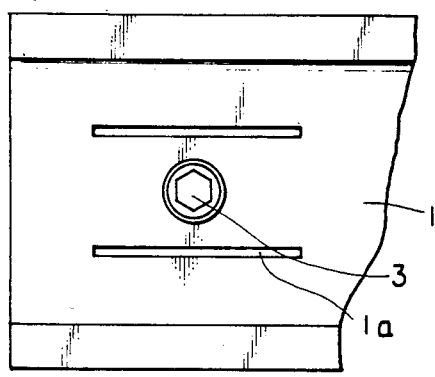
FIGS. 1a through 1c are schematic illustrations showing several embodiments of the present invention when slits are provided to define a mounting area in the guide rail 1.

Referring now to FIG. 1a, there is shown a mounting structure constructed in accordance with one of the present invention. The structure of FIG 1a is applicable when the present invention is applied to the guide rail 1 of either type of linear motion rolling contact bearing assembly described above. A mounting hole is provided in the flat bottom wall of the guide rail 1 and the mounting bolt 3 is provided as extending through such a mounting hole. Around the mounting hole, a pair of straight slits 1a, 1a are provided as extending in parallel with the longitudinal axis of the guide rail 1 and on both sides of the mounting hole. Thus, the mounting area is defined by that portion of the bottom, wall of the guide rail 1 which is located in a rectangle definable by the pair of two slits 1a, 1a. With this structure, even if the bolt 3 is tightened for fixedly mounting the guide rail 1 to the supporting member 2, such as a machine frame, as shown in FIG. 1d, any deformation indicated by 1 in FIG. 1d is positively confined to the mounting area definable by the pair of slits 1a, 1a and no such deformation is produced in the rest of the guide rail 1. Thus, no error in the distance between the outermost points between the balls 5 fitted in guide grooves 1e on both sides of the guide rail is produced, thereby allowing to maintain this distance within a predetermined tolerance before and after mounting. As set forth before, this feature is extremely important in the case when the guide rail 1 is made from a thin steel plate.

Figure 1B:
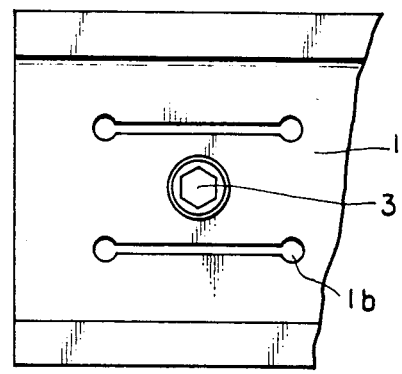
Figure 1C:
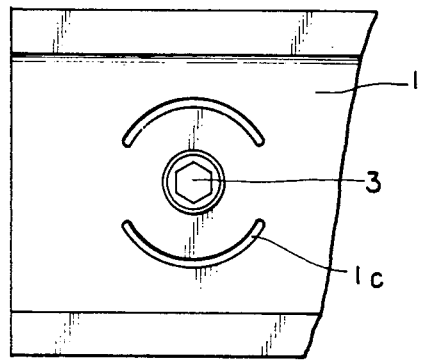
Figure 1D:
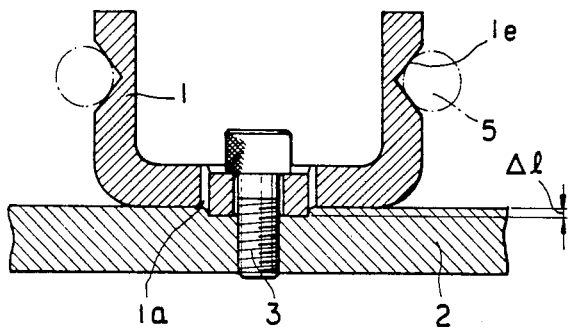
FIG. 1d is a schematic, transverse, cross sectional view showing the condition when the guide rail 1 provided with slits 1a as shown in FIG. 1a is mounted on a supporting member 2 by means of the bolt 3.

FIG. 1b shows a modification of the structure shown in FIG. 1a, in which a hole 1b having a diameter larger than the width of the slit 1a is provided at each end of the slit 1a. This structure further enhances the isolation of the mounting area from the rest of the guide rail 1 as far as the prevention of transmission of deformation is concerned. FIG. 1c shows another modification of the structure shown in FIG. 1a in which the slits 1a, 1a are curved to define arcuate slits 1c, 1c. In this particular embodiment, the pair of curved slits 1c constitutes part of a circle having its center located at the center of the mounting hole through which the bolt 3 extends. This structure also contributes to isolating the mounting area more positively. Thus, any deformation or error in size produced at the mounting area definable by the pair of arcuate slits 1c, 1c is confined in the mounting area and prevented from being transmitted to any other part of the guide rail 1.

Figure 2A:
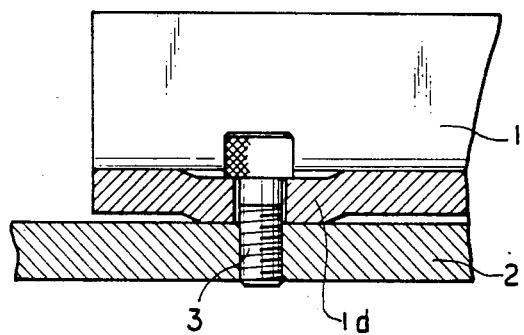
FIGS. 2a and 2b are schematic, cross sectional views showing alternative embodiments of the present invention wherein an outwardly projecting stepped portion is provided to define the mounting area.
Figure 2B:
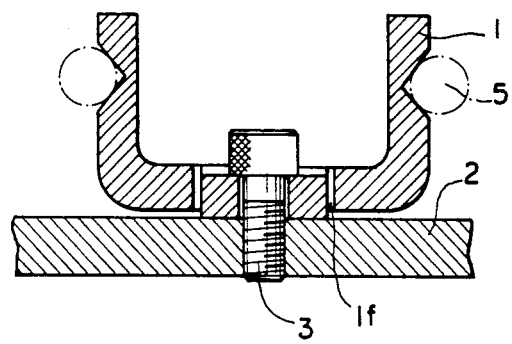

FIG. 2a and 2b show another embodiment of the present invention in which the bottom wall of the guide rail 1 is provided with not only a pair of straight slits 1f, 1f on both sides of the mounting hole through which the bolt 3 extends, but also an outwardly projecting stepped section 1d. Described more in detail, the stepped section 1d is defined as locally projecting outwardly from the outer surface of the bottom wall of the guide rail 1 and this stepped section 1d has a generally rectangular shape whose pair of opposite sides are defined by the pair of straight slits 1f, 1f located spaced apart from each other and extending in parallel with the longitudinal axis of the guide rail 1. Thus, in this embodiment, the mounting area is more positively defined by the provision of the outwardly projecting stepped section 1d so that the transmission of errors in size or deformation is more effectively prevented.

Figure 3:
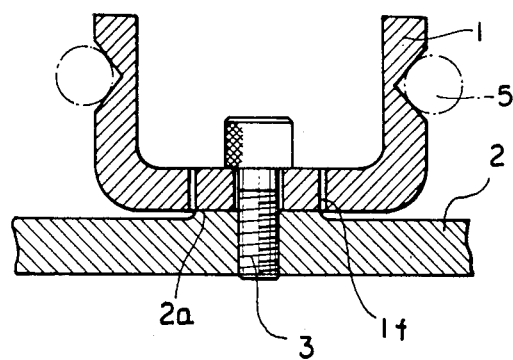
FIG. 3 is a schematic, transverse, cross sectional view showing another alternative embodiment of the present invention.

FIG. 3 shows a modification of the structure shown in FIGS. 2a and 2b. In this case, a projection 2a is provided on the side of the supporting member 2. That is, the supporting member 2 to which the guide rail 1 is to be mounted fixedly is provided with the outwardly extending stepped portion 2a which is generally commensurate in shape with the mounting area definable by the pair of slits 1f, 1f formed in the bottom wall of the guide rail 1. Accordingly, as with the embodiment shown in FIGS. 2a and 2b, the guide rail 1 comes into contact with the supporting member 2 only through its mounting area defined around the mounting hole. This embodiment is almost comparable with the embodiment shown in FIGS. 2a and 2b as far as effects are concerned.

It is to be noted that only two slits are provided around a mounting hole to define a mounting area in either of the above-described embodiments; however, any desired number of slits, including one, three or more, may be provided as extending in any direction, if desired. The critical point is that such a slit or slits of any desired shape, such as straight, circular or any other shape, can define a mounting are in which any deformation or error in size is confined an prevented deformation from being transmitted to any other section of the body. Moreover, in the above-described embodiments, slits and a stepped section are provided in the guide rail 1, but these elements may also be provided in the slider member 4.

Figure 4A:
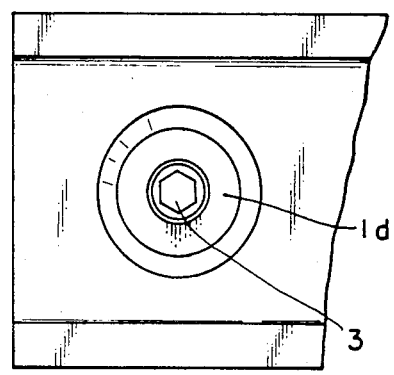
FIGS. 4a and 4b are schematic plan and transverse, cross sectional views, respectively, which show a further alternative embodiment of the present invention.
Figure 4B:
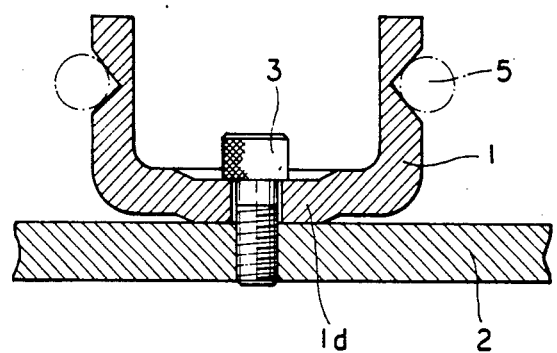
Figure 5:
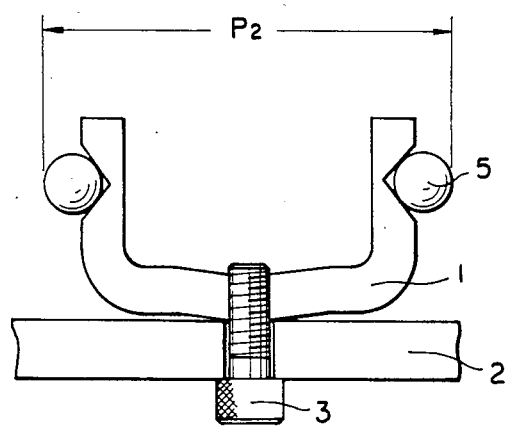
FIGS. 5 through 8 are schematic, cross sectional views showing typical examples of the prior art mounting structure.
Figure 6:
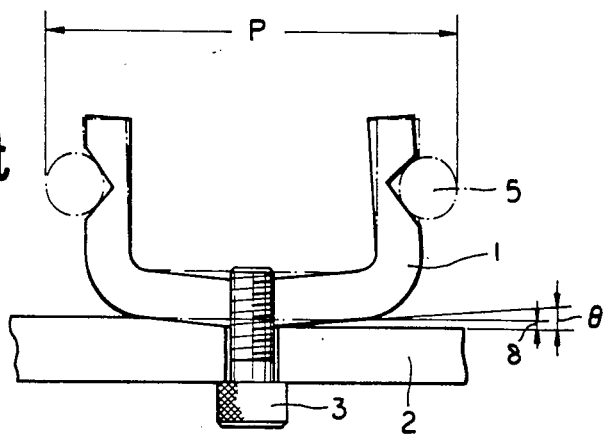
Figure 7:
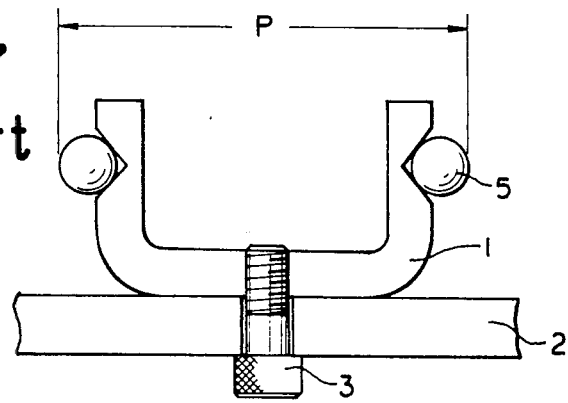
Figure 8:
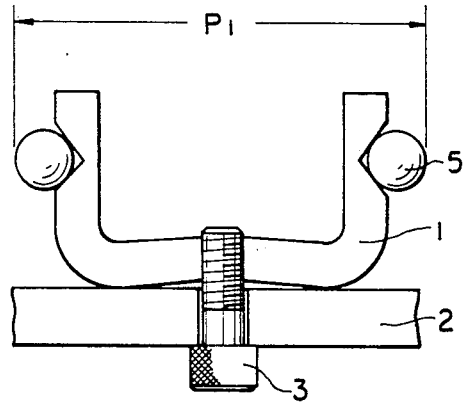

FIGS. 4a and 4b show another embodiment of the present invention in which only an outwardly projecting stepped section 1d, circular in shape in this example, is provided in the bottom wall of the guide rail 1 without provision of any slit. The mounting area definable by the circular stepped section 1d is provided with a mounting hole at its center, through which the mounting bolt 3 extends into a threaded hole provided in the supporting member 2. In this case, only the outer surface of the mounting area defined by the stepped section 1d comes into physical contact with the supporting member 2 when the guide rail 1 is fixedly mounted on the supporting member 2 by means of the bolt 3. It should be understood that any error in size or deformation is effectively limited to the mounting area defined by the stepped section 1d and it is prevented from being transmitted to any other section of the guide rail 1. It is to be noted that this structure may also be applied to the slider member 4, if desired.

As described in detail above, in accordance with the present invention, dimensional accuracy and bearing performance can be maintained virtually unchanged between before and after mounting of a bearing assembly. This advantage is particularly important for both types of linear motion rolling contact bearing assemblies because it is often desired to use a thin steel plate to form its guide rail and/or slider member. A predetermined pressure applied to a bearing assembly when manufactured may be maintained constant between before and after mounting so that the integrity and rigidity of a bearing assembly can be secured. Besides, the present structure may be provided with ease and at low cost.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact bearing assembly, comprising:
    an elongated guide rail extending over a length and having a generally U-shaped cross section, said rail being formed by a steel plate and including a flat wall and a pair of integral side walls;
    a slider member having a generally inverted U-shaped cross section, said slider member being formed by a steel plate and including a flat wall and a pair of integral said walls;
    a plurality of rolling members interposed between said rail and said slider member for allowing relative motion between said rail and said slider member;
    wherein at least one mounting hole is formed in and extends through said flat wall of at least one of said rail and said slider member, said at least one mounting hole being located approximately at the center of said flat wall in the transverse direction which is normal to a direction of relative motion between said rail and said slider member; and
    wherein a pair of slits is formed in said flat wall on opposite sides of said mounting hole to thereby define a mounting area around said mounting hole.

2. The assembly of claim 1 wherein said mounting area is projected outwardly from said flat surface.

3. The assembly of claim 1 wherein said slits are located symmetrically on opposite sides of said mounting hole in the transverse direction.

4. The assembly of claim 3 wherein said slits are arcuate in shape and symmetrical with respect to the center of said mounting hole with a concave side of each of the arcuate slits being directed toward said mounting hole.

5. The assembly of claim 3 wherein said slits are straight and parallel to each other.

6. The assembly of claim 5 wherein said straight slits extend in parallel with the direction of relative motion between said rail and said slider member.

7. The assembly of claim 6 wherein a hole having a diameter larger than the width of the slits is also formed in said flat plate at each end of each of said slits.

8. The assembly of claim 1 wherein said steel plate is a thin steel plate.

* * * * *